(12) United States Patent
Tanaka

(10) Patent No.: US 8,195,138 B2
(45) Date of Patent: Jun. 5, 2012

(54) COMMUNICATION CONTROL SYSTEM, MOBILE COMMUNICATION SWITCHING DEVICE, SUBSCRIBER INFORMATION MANAGEMENT DEVICE, AND COMMUNICATION CONTROL METHOD

(75) Inventor: Itsuma Tanaka, Yokohama (JP)

(73) Assignee: NTT Docomo, Inc., Tokyo (JP)

(*) Notice: Subject to any disclaimer, the term of this patent is extended or adjusted under 35 U.S.C. 154(b) by 0 days.

(21) Appl. No.: 13/057,856

(22) PCT Filed: Aug. 4, 2009

(86) PCT No.: PCT/JP2009/063804
§ 371 (c)(1),
(2), (4) Date: Apr. 20, 2011

(87) PCT Pub. No.: WO2010/016488
PCT Pub. Date: Feb. 11, 2010

(65) Prior Publication Data
US 2011/0189983 A1    Aug. 4, 2011

(30) Foreign Application Priority Data
Aug. 6, 2008 (JP) ................ P2008-203492

(51) Int. Cl.
*H04M 3/42* (2006.01)

(52) U.S. Cl. .................. 455/415; 455/428; 455/445

(58) Field of Classification Search .......... 455/415, 455/445, 428
See application file for complete search history.

(56) References Cited

U.S. PATENT DOCUMENTS

| | | | |
|---|---|---|---|
| 6,330,444 B1 | 12/2001 | Rune et al. | |
| 2006/0234712 A1* | 10/2006 | Fallis et al. | 455/445 |
| 2008/0009293 A1* | 1/2008 | Bennett et al. | 455/445 |
| 2008/0069073 A1 | 3/2008 | Sano | |

FOREIGN PATENT DOCUMENTS

| | | |
|---|---|---|
| JP | 2002 530961 | 9/2002 |
| JP | 2005 191880 | 7/2005 |

(Continued)

OTHER PUBLICATIONS

International Preliminary Report on Patentability and Written Opinion issued Mar. 17, 2011 in PCT/JP2009/063804 filed on Aug. 4, 2009.

(Continued)

*Primary Examiner* — Kwasi Karikari
(74) *Attorney, Agent, or Firm* — Oblon, Spivak, McClelland, Maier & Neustadt, L.L.P.

(57) ABSTRACT

In a communication control system 1, in an acquisition step of acquiring routing information before a line is set, a first mobile communication switching device 100 generates an acquisition request signal of routing information, which includes calling/called number specifying information and call information, and transmits the acquisition request signal to a subscriber information management device 200. The call information includes calling number information specifying a calling-side mobile communication terminal 600 and call type information representing a type of a call from the calling-side mobile communication terminal 600. The subscriber information management device 200 specifies a called-side second mobile communication switching device 300 based on the acquisition request signal and transmits an issuance request signal of a routing number to the second mobile communication switching device 300. The second mobile communication switching device 300 transmits the call information to a called-side mobile communication terminal 700 when a calling signal for acquiring the routing number is transmitted to the mobile communication terminal 700.

12 Claims, 7 Drawing Sheets

FOREIGN PATENT DOCUMENTS

| | | |
|---|---|---|
| JP | 2006 279782 | 10/2006 |
| JP | 2007 184855 | 7/2007 |
| JP | 2008 72488 | 3/2008 |

OTHER PUBLICATIONS

3GPP TS 23.272 V8.0.0, "$3^{RD}$ Generation Partnership Project; Technical Specification Group Services and System Aspects; Circuit Switched Fallback in Evolved Packet System; Stage 2 (Release 8)", GSM, pp. 1-41, (Jun. 2008).

3GPP TS 23.272 V8.3.0, "$3^{RD}$ Generation Partnership Project; Technical Specification Group Services and System Aspects; Circuit Switched Fallback in Evolved Packet System; Stage 2 (Release 8)", LTE, pp. 1-47, (Mar. 2009).

3GPP TS 23.018 V8.0.0, "$3^{RD}$ Generation Partnership Project; Technical Specification Group Core Network and Terminals; Basic Call Handling; Technical Realization (Release 7)", GSM, pp. 1-282, (Jun. 2008).

Office Action issued Oct. 6, 2009 in Japanese Patent Application No. JP 2008-203492 filed Aug. 6, 2008. (with English translation).

International Search Report issued Oct. 6, 2009 in PCT/JP09/063804 filed Aug. 4, 2009.

\* cited by examiner

COMMUNICATION CONTROL SYSTEM, MOBILE COMMUNICATION SWITCHING DEVICE, SUBSCRIBER INFORMATION MANAGEMENT DEVICE, AND COMMUNICATION CONTROL METHOD

TECHNICAL FIELD

The present invention relates to a communication control system, a mobile communication switching device, a subscriber information management device and a communication control method, in which a pre-paging is performed, and more particularly, to a communication control system, a mobile communication switching device, a subscriber information management device and a communication control method, which is compatible with a CS (Circuit Switched) fallback.

BACKGROUND ART

As a conventional mobile communication network, there are 2G (2nd Generation) networks such as a GERAN and 3G (3rd Generation) networks such as an UTRAN. In the conventional 2G/3G network, both voice call and data communication services are provided, but 3.9G (3.9 Generation) networks such as an E-UTRAN have been under review to realize a faster high-speed data communication. Since a main object of the 3.9G network is to provide a high-speed data communication service, to perform a voice call by paging the voice call service to a mobile communication terminal resident in the 3.9G network, a mobile communication network in which the mobile communication terminal is resident needs to be transitioned from the 3.9G network to the 2G/3G network to receive the voice call service using 2G/3G service. Such switching of the mobile communication network is referred to as CS fallback (see Non patent Literature 1), and a communication control system compatible with the CS fallback is known.

In a communication control system including the communication control system compatible with the CS fallback, when a call is made from one mobile communication terminal to another mobile communication terminal, at first, acquisition of information specifying a mobile communication switching device (MSC) that manages a called-side mobile communication terminal and routing information such as a routing number allocated to the called-side mobile communication terminal in the mobile communication switching device is performed. Then, a line between both the mobile communication terminals is set based on the acquired routing information, and thereby the voice call is established. At the time of setting the line, in the communication control system compatible with the CS fallback, to increase a communication efficiency, a simultaneous paging to the called-side mobile communication terminal is performed before performing the allocation of a routing number, and so-called pre-paging is performed where the routing number is allocated only in a case where a response is made (see Non patent Literature 2).

PRIOR ART LITERATURE

Non Patent Literature

Non patent Literature 1: 3GPP Specification detail, 3GPP TS 23.272, Circuit Switched (CS) fallback in Evolved Packet System (EPS); Stage 2

Non Patent Literature 2: 3GPP TS 23.018 V8.0.0 (2008-06), 3rd Generation Partnership Project, Technical Specification Group Core Network and Terminals, Basic call handling, Technical realization (Release 7)

SUMMARY OF INVENTION

Problem to be Solved by Invention

However, when the allocation of the routing number by the pre-paging is performed, since a calling number specifying information that specifies a calling number of the calling-side mobile communication terminal and call information such as call type information (service type information), for example, whether the call made by the calling-side mobile communication terminal is a voice call or a videophone call, is supposed to be obtained at the time of setting the line between the mobile communication terminals after the pre-paging, the above-described call information may not be transmitted to the called-side mobile communication terminal at the time of the pre-paging. Therefore, in a case where a call is made to the called-side mobile communication terminal while the data communication is performed, for example, a user of the called-side mobile communication terminal may not recognize the call contents at an early stage, and may not determine at an early stage whether to terminate the data communication and reply to the call or not. In addition, in the communication control system compatible with the CS fallback, in a case where a call is made to the called-side mobile communication terminal while performing the data communication, if the line is set, the CS fallback is automatically performed irrespective of an intention of a user (called party) of called-side mobile communication terminal and the data communication is terminated or the speed is supposed to be lowered. Therefore, the called party may not determine whether to maintain the data communication with the 3.9G network or reply to the call, that is, the switching of the mobile communication network, resulting in inconvenience.

The present invention has been made to solve the above-described problems, and an object of the invention is to provide a communication control system, a mobile communication switching device, a subscriber information management device and a communication control method, which can notify a called party of call contents at an early stage, in a communication control system performing a pre-paging.

Means for Solving the Problem

To solve the above-described problem, a communication control system of the invention is a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set. In the communication control system, the first mobile communication switching device includes call request signal receiving means that receives, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal; and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device. The subscriber information management device includes acquisition request signal receiving means that receives the acquisition request signal of the routing information from the first mobile communication switching device; mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information; and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means. The second mobile communication switching device includes issuance request signal receiving means that receives the issuance request signal of the routing number from the subscriber information management device; calling signal transmitting means that transmits the calling signal to the called-side mobile communication terminal based on the issuance request signal of the routing number received by the issuance request signal receiving means; call information notifying means that extracts the call information from the issuance request signal of the routing number received by the issuance request signal receiving means, and transmits the call information to the called-side mobile communication terminal when the calling signal transmitting means transmits the calling signal; and acquisition means that receives a response signal transmitted from the called-side mobile communication terminal in response to the transmission of the calling signal from the calling signal transmitting means and acquires the routing number.

In addition, a first mobile communication switching device of the invention is a first mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The first mobile communication switching device includes call request signal receiving means that receives, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal; and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device.

In addition, a subscriber information management device of the invention is a subscriber information management device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The subscriber information management device includes acquisition request signal receiving means that receives, from the first mobile communication switching device, the acquisition request signal of the routing information, which includes calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal; mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information; and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means.

In addition, a second mobile communication switching device of the invention is a second mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The second mobile communication switching device includes issuance request signal receiving means that receives, from the subscriber information management device, the issuance request signal of the routing number which includes calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal; calling signal transmitting means that transmits the calling signal to the called-side mobile communication terminal based on the issuance request signal of the routing number received by the issuance request signal receiving means; call information notifying means that extracts the call information from the issuance request signal of the routing number received by the issuance request signal receiving means, and transmits the call information to the called-side mobile communication terminal when the calling signal transmitting means transmits the calling signal; and acquisition means that receives a response signal transmitted from the called-side mobile communication terminal in response to the transmission of the calling signal from the calling signal transmitting means and acquires the routing number.

In addition, a communication control method of the invention is a communication control method of a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set. The communication control method includes a call request signal receiving step of causing the first mobile communication switching device to receive, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal, and an acquisition request signal transmitting step of causing the first mobile communication switching device to extract the calling/called number specifying information and the call information from the call request signal received in the call request signal receiving step, generate an acquisition request signal of routing information, which includes the calling/called number specifying information and the call information, and transmit the acquisition request signal of the routing information to the subscriber information management device; an acquisition request signal receiving step of causing the subscriber information management device to receive the acquisition request signal of the routing information from the first mobile communication switching device; a mobile communication switching device specifying step of causing the subscriber information management device to extract the calling/called number specifying information from the acquisition request signal of the routing information received in the acquisition request signal receiving step, and specify the second mobile communication switching device controlling the communication of the called-side mobile communication terminal with reference to the location registration information of the called-side mobile communication terminal specified by the calling/called number specifying information; an issuance request signal transmitting step of causing the subscriber information management device to extract the calling/called number specifying information and the call information from the acquisition request signal of the routing information received in the acquisition request signal receiving step, generate an issuance request signal of a routing number, which includes the calling/called number specifying information and the call information, and transmit the issuance request signal of the routing number to the second mobile communication switching device specified in the mobile communication switching device specifying step; an issuance request signal receiving step of causing the second mobile communication switching device to receive the issuance request signal of the routing number from the subscriber information management device; a calling signal transmitting step of causing the second mobile communication switching device to transmit the calling signal to the called-side mobile communication terminal based on the issuance request signal of the routing number received in the issuance request signal receiving step; a call information notifying step of causing the second mobile communication switching device to extract the call information from the issuance request signal of the routing number received in the issuance request signal receiving step, and transmit the call information to the called-side mobile communication terminal when the calling signal is transmitted in the calling signal transmitting step; and an acquisition step of causing the second mobile communication switching device to receive a response signal transmitted from the called-side mobile communication terminal in response to the transmission of the calling signal in the calling signal transmitting step and acquire the routing number.

According to the above-described communication control system, the mobile communication switching device, subscriber information management device and the communication control method of the invention, in the routing information acquisition step before a line is set, the first mobile communication switching device generates the acquisition request signal of routing information, which includes the call information, and transmits it to the subscriber information management device. Subsequently, the subscriber information management device that received the acquisition request signal of routing information, which includes the call information, specifies the called-side second mobile communication switching device and also generates the issuance request signal of a routing number, which includes the call information, and transmits the issuance request signal of the routing number to the specified second mobile communication switching device. Then, when the second mobile communication switching device, which received the issuance request signal of the routing number, which includes the call information, transmits the calling signal to the called-side mobile communication terminal, call information that includes at least one of calling number information specifying the calling-side mobile communication terminal and call type information representing a type of a call from the calling-side mobile communication terminal is transmitted to the called-side mobile communication terminal. As described above, when the second mobile communication switching device transmits a calling signal, that is, when the pre-paging is performed, the call contents of the calling-side mobile communication terminal are transmitted together. Therefore, it is possible to inform a user of the called-side mobile communication terminal, that is, a called party of the call contents at an early stage. In addition, "routing number" described here means a number allocated to the called-side mobile communication terminal in the second mobile communication switching device, and "routing information" means information including the above-mentioned "routing number" and specification information specifying the second mobile communication switching device that controls the called-side mobile communication terminal. In addition, a part of information may be commonly used between the "call information" and "calling/called number specifying information."

In addition, the communication control system of the invention may include mobile communication network switching means that receives a switching indication signal from the called-side mobile communication terminal, which indicates the switching from a mobile communication network in which the called-side mobile communication terminal is resident to another mobile communication network in which the calling-side mobile communication terminal is resident, in response to the transmission of the call information to the called-side mobile communication terminal by the call information notifying means, and switches the mobile communication network to cause the called-side mobile communication terminal to be resident in another mobile communication network in which the calling-side mobile communication terminal is resident. According to this, a called party may perform a selection of a mobile network with respect to the called-side mobile communication terminal.

To solve the above-described problem, a communication control system of the invention is a communication control system including a first mobile communication switching device that controls the communication of a calling-side mobile communication terminal; a second mobile communication switching device that controls the communication of a called-side mobile communication terminal; and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set. In this communication control system, the first mobile communication switching device includes call request signal receiving means that receives, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal, and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device. The subscriber information management device includes acquisition request signal receiving means that receives the acquisition request signal of the routing information from the first mobile communication switching device, mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information, and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means. The second mobile communication switching device includes issuance request signal receiving means that receives the issuance request signal of the routing number from the subscriber information management device, calling signal transmitting means that transmits the calling signal to the called-side mobile communication terminal based on the issuance request signal of the routing number received by the issuance request signal receiving means, call information notifying means that extracts the call information from the issuance request signal of the routing number received by the issuance request signal receiving means, and transmits the call information to the called-side mobile communication terminal when the calling signal transmitting means transmits the calling signal, and acquisition means that receives a response signal transmitted from the called-side mobile communication terminal in response to the transmission of the calling signal from the calling signal transmitting means and acquires the routing number. This communication control system may also include mobile communication network switching means that receives a switching indication signal from the called-side mobile communication terminal, which indicates the switching from a mobile communication network in which the called-side mobile communication terminal is resident to another mobile communication network in which the calling-side mobile communication terminal is resident, in response to the transmission of the call information to the called-side mobile communication terminal by the call information notifying means, and switches the mobile communication network to cause the called-side mobile communication terminal to be resident in another mobile communication network in which the calling-side mobile communication terminal is resident.

In addition, a first mobile communication switching device of the invention is a first mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The first mobile communication switching device includes call request signal receiving means that receives, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal; and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device.

In addition, a subscriber information management device of the invention is a subscriber information management device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The subscriber information management device includes acquisition request signal receiving means that receives, from the first mobile communication switching device, the acquisition request signal of the routing information, which includes calling/called number specifying information that specifies a calling number of the calling-side mobile communication terminal and a called number of the called-side mobile communication terminal, and call information that is calling number information specifying the calling-side mobile communication terminal; mobile communication switching device specifying means that extracts the calling/called number specifying information from the acquisition request signal of the routing information received by the acquisition request signal receiving means, and specifies the second mobile communication switching device controlling the communication of the called-side mobile communication terminal, with reference to the location registration information of the called-side mobile communication terminal specified by the calling/called number specifying information; and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means.

In addition, a second mobile communication switching device of the invention is a second mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set. The second mobile communication switching device includes issuance request signal receiving means that receives, from the subscriber information management device, the issuance request signal of the routing number which includes calling/called number specifying information that specifies a calling number of the calling-side mobile communication terminal and a called number of the called-side mobile communication terminal, and call information that is calling number information specifying the calling-side mobile communication terminal; calling signal transmitting means that transmits the calling signal to the called-side mobile communication terminal based on the issuance request signal of the routing number received by the issuance request signal receiving means; call information notifying means that extracts the call information from the issuance request signal of the routing number received by the issuance request signal receiving means, and transmits the call information to the called-side mobile communication terminal when the calling signal transmitting means transmits the calling signal; and acquisition means that receives a response signal transmitted from the called-side mobile communication terminal in response to the transmission of the calling signal from the calling signal transmitting means and acquires the routing number.

In addition, a communication control method of the invention is a communication control method of a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set. The communication control method includes a call request signal receiving step of causing the first mobile communication switching device to receive, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal, and an acquisition request signal transmitting step of causing the first mobile communication switching device to extract the calling/called number specifying information and the call information from the call request signal received in the call request signal receiving step, generate an acquisition request signal of routing information, which includes the calling/called number specifying information and the call information and transmit the acquisition request signal of the routing information to the subscriber information management device; an acquisition request signal receiving step of causing the subscriber information management device to receive the acquisition request signal of the routing information from the first mobile communication switching device; a mobile communication switching device specifying step of causing the subscriber information management device to extract the calling/called number specifying information from the acquisition request signal of the routing information received in the acquisition request signal receiving step, and specify the second mobile communication switching device controlling the communication of the called-side mobile communication terminal with reference to the location registration information of the called-side mobile communication terminal specified by the calling/called number specifying information; an issuance request signal transmitting step of causing the subscriber information management device to extract the calling/called number specifying information and the call information from the acquisition request signal of the routing information received in the acquisition request signal receiving step, generate an issuance request signal of a routing number, which includes the calling/called number specifying information and the call information, and transmit the issuance request signal of the routing number to the second mobile communication switching device specified in the mobile communication switching device specifying step; an issuance request signal receiving step of causing the second mobile communication switching device to receive the issuance request signal of the routing number from the subscriber information management device; a calling signal transmitting step of causing the second mobile communication switching device to transmit the calling signal to the called-side mobile communication terminal based on the issuance request signal of the routing number received in the issuance request signal receiving step; a call information notifying step of causing the second mobile communication switching device to extract the call information from the issuance request signal of the routing number received in the issuance request signal receiving step, and transmit the call information to the called-side mobile communication terminal when the calling signal is transmitted in the calling signal transmitting step; and an acquisition step of causing the second mobile communication switching device to receive a response signal transmitted from the called-side mobile communication terminal in response to the transmission of the calling signal in the calling signal transmitting step and acquire the routing number.

Effect of Invention

According to the invention, it is possible to notify a called side of call contents at an early stage.

DESCRIPTION OF REFERENCE SYMBOLS

Figure 1:
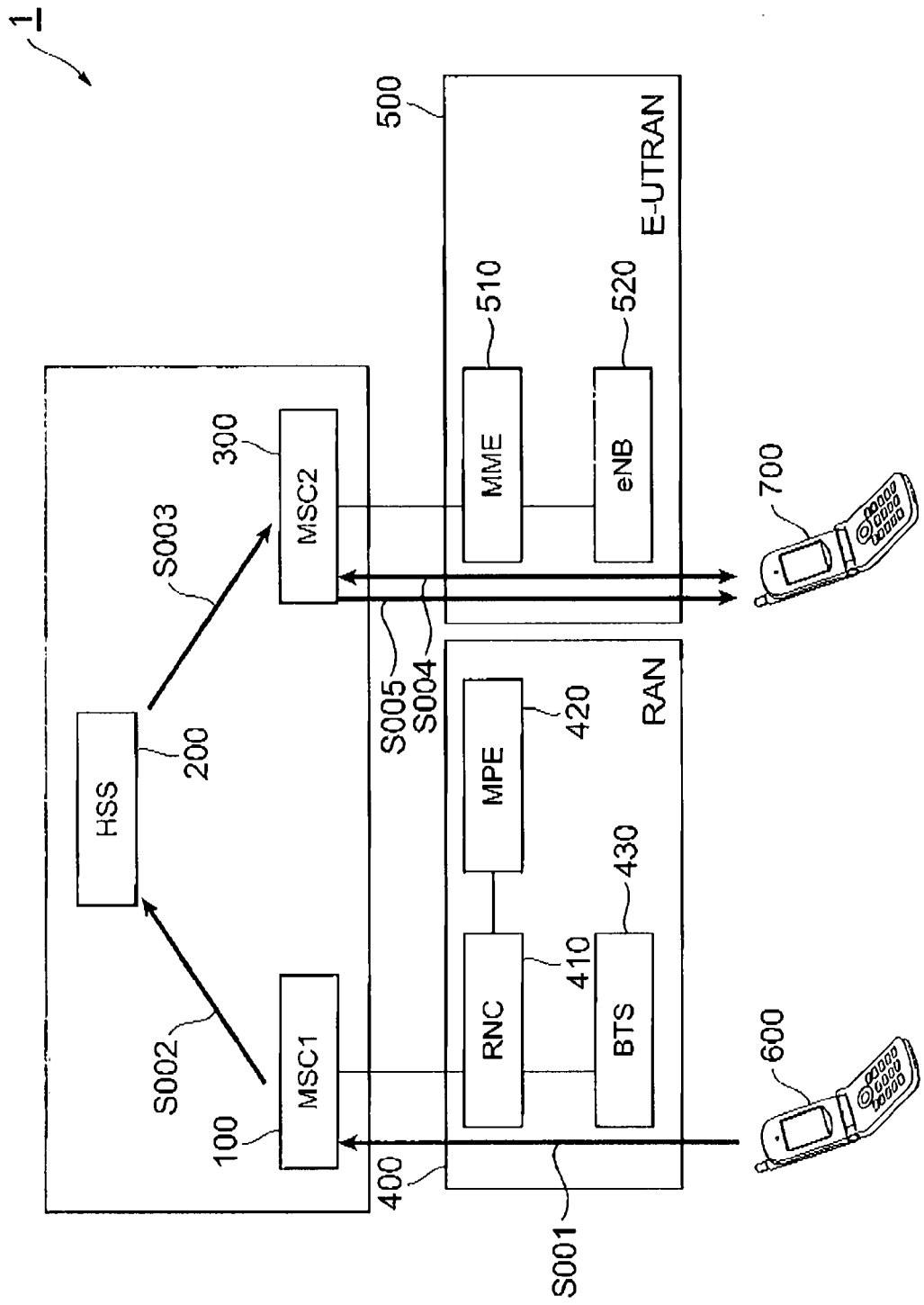
FIG. 1 is a schematic configuration diagram illustrating a communication control system according to an embodiment of the invention.

100 . . . First mobile communication switching device; 110 . . . Call request signal receiving unit (call request signal receiving means); 120 . . . Acquisition request signal transmitting unit (acquisition request signal transmitting means); 200 . . . Subscriber information management device; 210 . . . Storage unit; 220 . . . Acquisition request signal receiving unit (acquisition request signal receiving means); 230 . . . Mobile communication switching device specifying unit (mobile communication switching device specifying means); 240 . . . Issuance request signal transmitting unit (issuance request signal transmitting means); 300 . . . Second mobile communication switching device; 310 . . . . Issuance request signal receiving unit (issuance request signal receiving means); 320 . . . Calling signal transmitting unit (calling signal transmitting means); 330 . . . Call information notifying unit (call information notifying means); 340 . . . Acquisition unit (acquisition means); 350 . . . Mobile communication network switching unit (mobile communication network switching means); 360 . . . Issuance response signal transmitting unit (issuance response signal transmitting means); 400 . . . Radio access network; 500 . . . E-UTRAN; 600 . . . Calling-side mobile communication terminal; 700 . . . Called-side mobile communication terminal

MODE FOR CARRYING OUT THE INVENTION

Hereinafter, preferred embodiments of a communication control system, a mobile communication switching device (MSC: Mobile Switching Center), a subscriber information management device (HSS: Home Subscriber Server), and communication control method according to the present invention will be described in detail with reference to the accompanying drawings. In the description of the drawings, the same reference numerals will be given to the same elements and redundant description will be omitted.

(Entire Configuration of Communication Control System 1)

Figure 2:
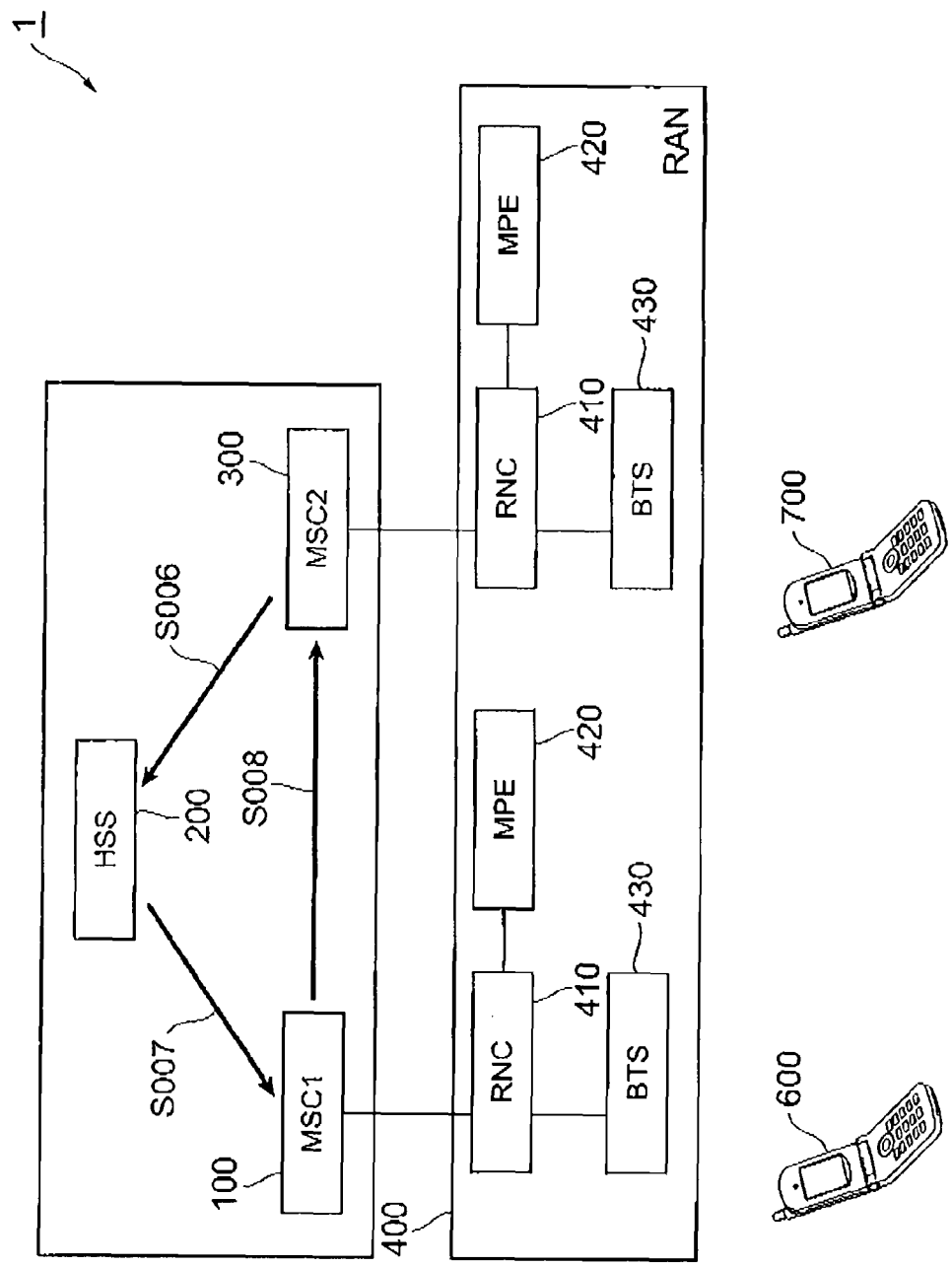
FIG. 2 is a schematic configuration diagram illustrating a communication control system according to an embodiment of the invention.

First, the entire configuration of the communication control system 1 according to a first embodiment of the invention will be described with reference FIGS. 1 and 2. FIG. 1 is a schematic configuration diagram illustrating a communication control system 1 at the time of acquiring a routing number. FIG. 2 is a schematic configuration diagram illustrating a communication control system 1 after the routing number is acquired. As shown in FIGS. 1 and 2, the communication control system 1 includes a first mobile communication switching device (MSC 1) 100, a subscriber information management device 200, a second mobile communication switching device (MSC 2) 300, and a plurality of mobile communication switching devices (not shown). The first mobile communication switching device 100, the second mobile communication switching device 300 and the plurality of mobile communication switching devices (not shown) have substantially the same configuration, respectively, connect to the subscriber information management device 200, and control the communication of resident mobile communication terminals 600 and 700 and a plurality of other mobile communication terminals (not shown).

The communication control system 1 is connected to a radio network such as a radio access network (RAN) 400 or an E-UTRAN 500 via the first mobile communication switching device 100, the second mobile communication switching device 300 and other mobile communication switching devices (not shown) in order to make up a mobile communication network, and this mobile communication network provide a plurality of mobile communication terminals with a mobile communication function. The radio access network 400, which is one of the radio networks, includes a plurality of units each having a radio control device (RNC: Radio Network Control) 410 connecting each of the mobile communication terminals and each of the mobile communication switching devices, a multimedia signal processing device (MPE) 420 and a base station (BTS: base transceiver station) 430 as one set, and makes up a 2G network such as a GERAN or a 3G network such as a UTRAN together with the communication control system 1. In the 2G/3G network, a voice call service and data communication service are provided.

The E-UTRAN 500, which is another radio network, includes a plurality of units each having a mobile communication management device (MME: Mobility Management Entry) 510, which connects each of the mobile communication terminals and each of the mobile communication switching devices, and a base station (eNB) 520, and the E-UTRAN 500 makes up a 3.9G network such as an E-UTRAN together with the communication control system 1. For example, in FIG. 1, there is shown a circumstance where one mobile communication terminal 600 is resident in the radio access network 400 and another mobile communication terminal 700 is resident in the E-UTRAN 500. In addition, in FIG. 2, there is shown a circumstance where both the mobile communication terminals 600 and 700 are resident in the radio access network 400. In addition, the mobile communication terminal resident in the 3.9G network can perform a faster high-speed data communication compared to the data communication in 2G/3G network, but the voice call service is not provided in the 3.9G network and therefore the mobile communication terminal may not perform the voice call when it is resident in the 3.9G network. Therefore, when the voice call is attempted by the mobile communication terminal compatible with the 3.9G network, the resident mobile communication network is switched to the radio access network 400 in which the voice call service is provided to get the voice call service. Such switching of the mobile communication network is referred to as CS fallback. In addition, to access each of the radio networks of the radio access network 400 and the E-UTRAN 500, a different function is required, respectively, and the mobile communication terminal 700 has at least a function capable of connecting to both the radio networks.

Here, with respect to general procedures for initiating a calling between the mobile communication terminals by the communication control system 1, a case where CS fallback is performed will be described with reference to FIGS. 1 and 2, as an example. In addition, for convenience of explanation, the mobile communication terminal 600 is described as a calling-side mobile communication terminal, the mobile communication terminal 700 is described as a called-side mobile communication terminal, the first mobile communication switching device 100 is described as a mobile communication switching device that controls the communication of the calling-side mobile communication terminal, and the second mobile communication switching device 300 is described as a mobile communication switching device that controls the communication of the called-side mobile communication terminal. However, each of the mobile communication terminals or each of the mobile communication switching devices has substantially the same configuration, respectively, such that it is not limited to that described in the explanation, and it may be either calling-side or called-side.

First, when a voice call is attempted from the mobile communication terminal 600 that is resident in the radio access network 400 with respect to the mobile communication terminal 700 that is resident in the E-UTRAN 500 and is performing a data communication, a call request is made from the calling-side mobile communication terminal 600 with respect to the first mobile communication switching device 100 (S001). The first mobile communication switching device 100 to which the call request is made makes an acquisition request of the routing information to the subscriber information management device 200 (S002). The routing information includes specification information that specifies the second mobile communication switching device 300 among the plurality of mobile communication switching devices and a routing number allocated to the called-side mobile communication terminal 700. The subscriber information management device 200 to which the acquisition request is made specifies the second mobile communication switching device 300 with reference to location registration information of the called-side mobile communication terminal 700. In addition, the subscriber information management device 200 makes an issuance request of the routing number with respect to the specified second mobile communication switching device 300 (S003).

The second mobile communication switching device 300 to which the issuance request is made makes a call to the called-side mobile communication terminal 700 in response to the issuance request (S004). When the called-side mobile communication terminal 700 complies with the call request, it responds to the call (S004), and the second mobile communication switching device 300 allocates a routing number corresponding to one communication channel to the called-side mobile communication terminal 700. In addition, concurrently with the allocation of the routing number, the mobile communication terminal 700 performs a CS fallback, the radio network in which the called-side mobile communication terminal 700 is resident is switched from the E-UTRAN 500 to a radio access network 400. After the routing number is acquired, the routing number is given as a response to the first mobile communication switching device 100 via the subscriber information management device 200 (S006, S007). Then, the first mobile communication switching device 100 sets a line to the second mobile communication switching device 300 based on the routing number (S008), and a voice call between the calling-side mobile communication terminal 600 and the called-side mobile communication terminal 700 is initiated. Hereinafter, each component making up the communication control system 1 will be described in detail.

(Configuration of First Mobile Communication Switching Device 100)

Figure 3:
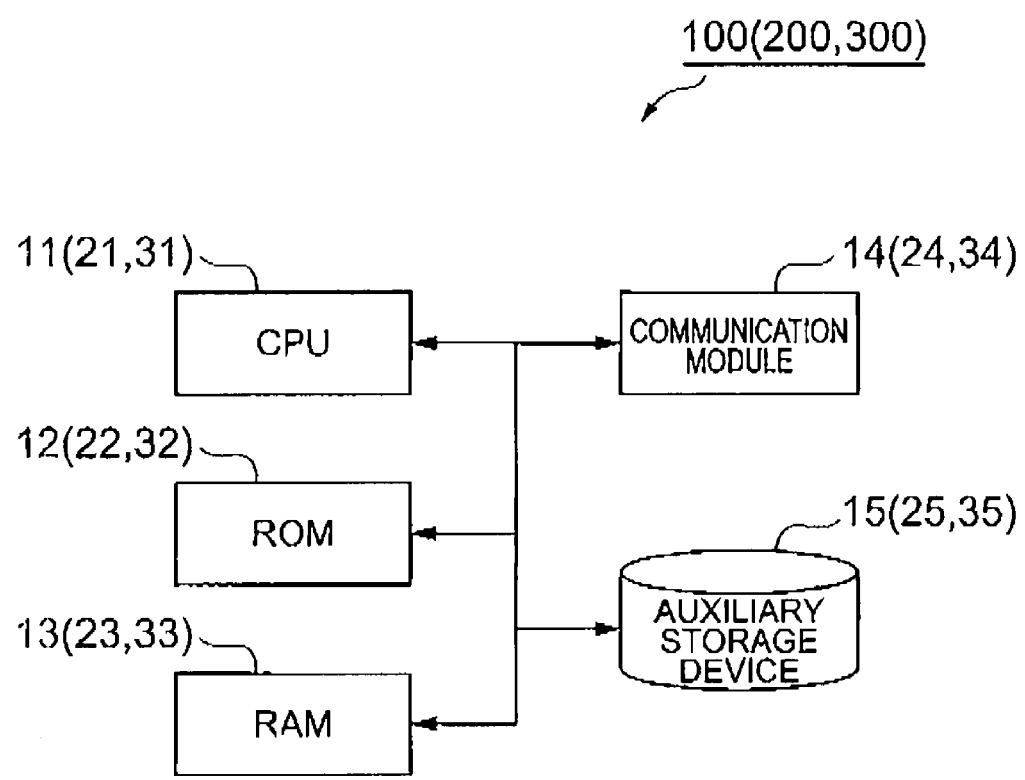
FIG. 3 is a configuration diagram illustrating hardware of first and second mobile communication switching devices and a subscriber information management device.

The first mobile communication switching device 100 will be described. FIG. 3 shows a hardware configuration diagram of the first mobile communication switching device 100. As shown in FIG. 3, the first mobile communication switching device 100 is physically constructed as a general computer system including, among others, a CPU 11, a main storage device such as a ROM 12 and a RAM 13, a communication module 14 such as a network card, which transmits and receives data between the subscriber information management device 200, the second mobile communication switching device 300, the radio access network 400, the E-UTRAN 500 and the mobile communication terminal 600, and an auxiliary storage device 15 such as a hard disk. Each function of the first mobile communication switching device 100, which is described later, is realized in a manner such that hardware such as the CPU 11, the ROM 12 and the RAM 13 is caused to read predetermined computer software and thereby the communication module 14 operates under the control of the CPU 11 while data is read from and written in the main storage devices 12, 13 or the auxiliary storage device 15.

Figure 4:
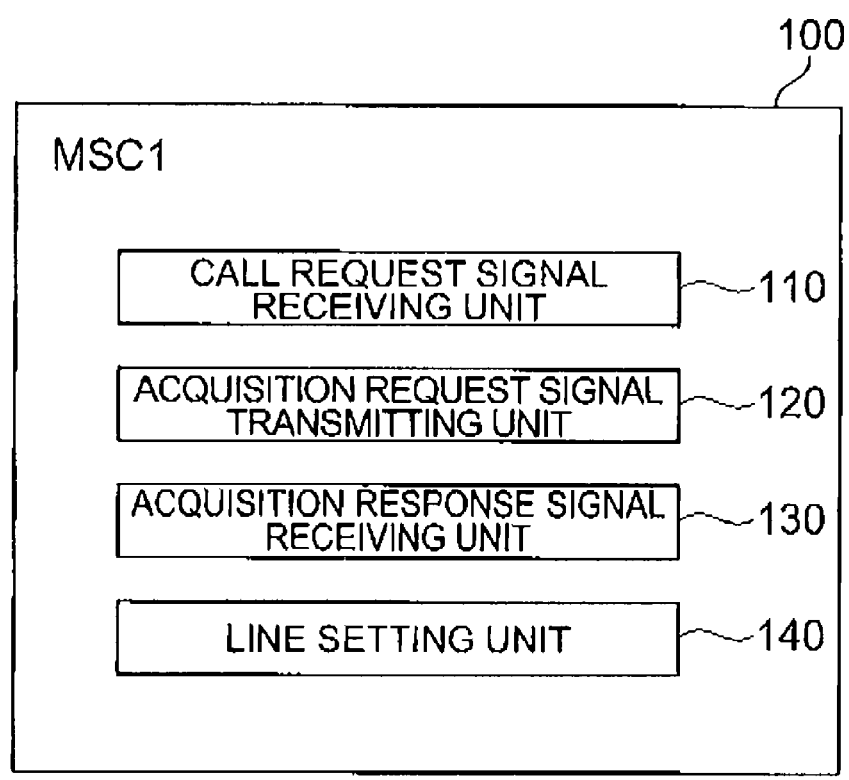
FIG. 4 is a schematic configuration diagram illustrating the first mobile communication switching device.

FIG. 4 shows a schematic diagram of the first mobile communication switching device 100. As shown in FIG. 4, the first mobile communication switching device 100 functionally includes a call request signal receiving unit (call request signal receiving means) 110, an acquisition request signal transmitting unit (acquisition request signal transmitting means) 120, an acquisition response signal receiving unit 130 and a line setting unit 140.

The call request signal receiving unit 110 receives the call request signal from the calling-side mobile communication terminal 600. The call request signal receiving unit 110 receives the call request signal from the calling-side mobile communication terminal 600 via the radio access network 400 (S001 of FIG. 1). The call request signal includes calling/called number specifying information that specifies a calling number of the calling-side mobile communication terminal 600 and a called number of the called-side mobile communication terminal 700, and call information including calling number information specifying the calling-side mobile communication terminal 600 and call type information representing a type of a call from the calling-side mobile communication terminal 600. The call request signal receiving unit 110 outputs the received call request signal to the acquisition request signal transmitting unit 120. The call type information can be exemplified by, among others, service information which represents that call contents related to the call request are of a general voice call, a videophone call or an acquisition request of location information. In addition, a part of information such as the calling number of the calling-side mobile communication terminal 600 may be commonly used between "call information" and "calling/called number specifying information" described in this embodiment.

The acquisition request signal transmitting unit 120 transmits the acquisition request signal of the routing information to the subscriber information management device 200. When receiving the call request signal from the call request signal receiving unit 110, the acquisition request signal transmitting unit 120 extracts the calling/called number specifying information and the call information from the call request signal, and generates the acquisition request signal of the routing information, which includes the calling/called number specifying information and call information. The acquisition request signal transmitting unit 120 transmits the acquisition request signal to the subscriber information management device 200 (S002 of FIG. 1).

The acquisition response signal receiving unit 130 receives an acquisition response signal of the routing information from the subscriber information management device 200 after the routing information is acquired. The acquisition response signal receiving unit 130 receives the acquisition response signal of the routing information from the subscriber information management device 200. The acquisition response signal includes the routing number, the specification information and the calling/called number specifying information, and the acquisition response signal receiving unit 130 extracts the routing number, the specification information and the calling/called number specifying information. The acquisition response signal receiving unit 130 outputs the extracted routing number, the specification information and the calling/called number specifying information to the line setting unit 140.

The line setting unit 140 sets a communication line between the first mobile communication switching device 100 and the second mobile communication switching device 300 after the routing information is acquired. When the routing number, the specification information and the calling/called number specifying information are input from the acquisition response signal receiving unit 130, the line setting unit 140 sets a line with respect to the routing number in the second mobile communication switching device 300 specified by the specification information, with the mobile communication terminal 600 specified by the calling number included in the calling/called number specifying information being a calling side (S008 of FIG. 2). Therefore, the calling-side mobile communication terminal 600 connects to the called-side mobile communication terminal 700, such that the voice call can be established between the both mobile communication terminals.

(Configuration of Subscriber Information Management Device 200)

The subscriber information management device 200 will be described. FIG. 3 shows a hardware configuration diagram of the subscriber information management device 200. As shown in FIG. 3, the subscriber information management device 200 is physically constructed as a general computer system including, among others, a CPU 21, a main storage device such as a ROM 22 and a RAM 23, a communication module 24 such as a network card, which transmits and receives data between the first mobile communication switching device 100 and the second mobile communication switching device 300, and an auxiliary storage device 25 such as a hard disk. Each function of the subscriber information management device 200, which is described later, is realized in a manner that the hardware such as the CPU 21, the ROM 22 and the RAM 23 is caused to read predetermined computer software and thereby the communication module 24 operates under the control of the CPU 21 while data is read from and written in the main storage devices 22, 23 or the auxiliary storage device 25.

Figure 5:
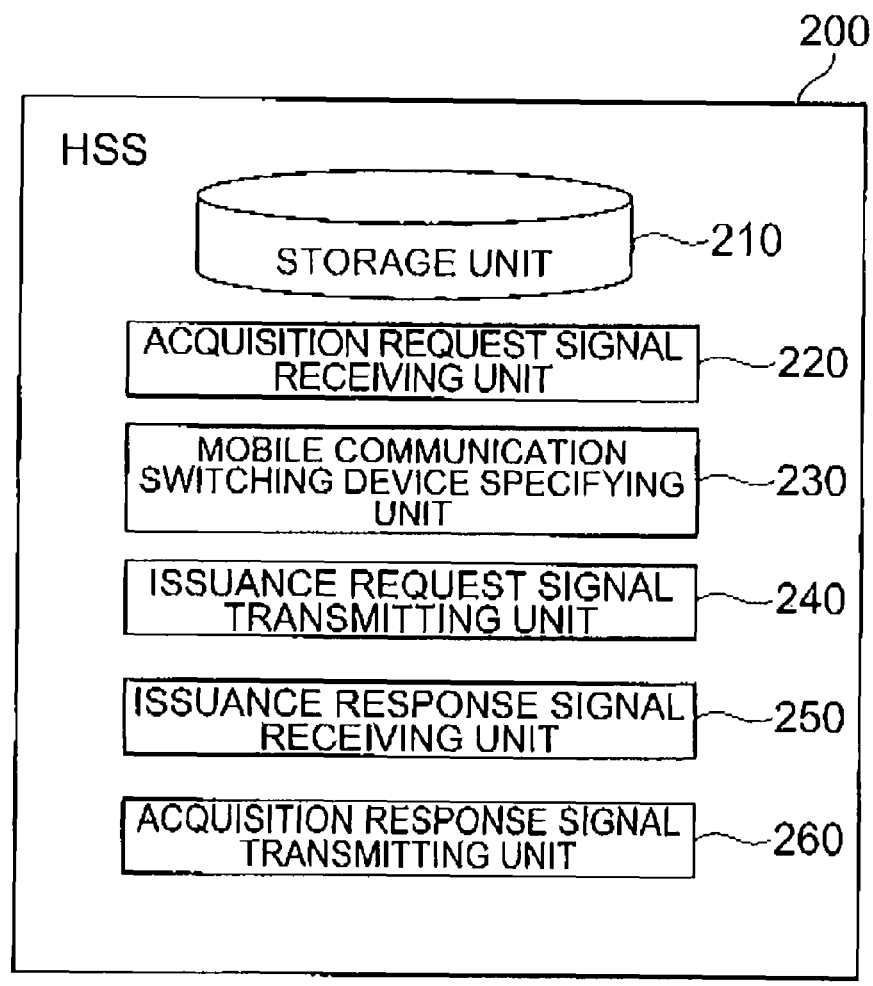
FIG. 5 is a schematic configuration diagram illustrating the subscriber information management device.

FIG. 5 shows a schematic configuration diagram illustrating the subscriber information management device 200. As shown in FIG. 5, the subscriber information management device 200 functionally includes a storage unit 210, an acquisition request signal receiving unit 220 (acquisition request signal receiving means), a mobile communication switching device specifying unit 230 (mobile communication switching device specifying means), an issuance request signal transmitting unit 240 (issuance request signal transmitting means), an issuance response signal receiving unit 250 and an acquisition response signal transmitting unit 260.

The storage unit 210 stores, for example, a location registration information of each of a plurality of mobile communication terminals such as the calling-side mobile communication terminal 600 and the called-side mobile communication terminal 700. The storage unit 210 stores a location registration information in which specification information specifying the first mobile communication switching device 100 that controls the communication of the calling-side mobile communication terminal 600 and the second mobile communication switching device 300 that controls the communication of the called-side mobile communication terminal 700, and a telephone number (calling number or called number) of each the mobile communication terminal are linked. When the calling-side mobile communication terminal 600 or the called-side mobile communication terminal 700 moves and therefore the resident mobile communication switching device is changed, the storage unit 210 updates the location registration information in response to a location registration request from the mobile communication terminal 600, 700, and stores the updated location registration information. The storage unit 210 outputs the specification information that specifies the second mobile communication switching device 300 to the mobile communication switching device specifying unit 230, in response to a request from the mobile communication switching device specifying unit 230 described later.

The acquisition request signal receiving unit 220 receives the acquisition request signal of the routing information from the first mobile communication switching device 100. The acquisition request signal receiving unit 220 receives the acquisition request signal of the routing information from the first mobile communication switching device 100. The acquisition request signal receiving unit 220 outputs the received acquisition request signal of the routing information to the mobile communication switching device specifying unit 230 and the issuance request signal transmitting unit 240.

The mobile communication switching device specifying unit 230 specifies the second mobile communication switching device 300 that controls the communication of the called-side mobile communication terminal 700. When receiving the acquisition request signal of the routing information from the acquisition request signal receiving unit 220, the mobile communication switching device specifying unit 230 extracts a called number that specifies the called-side mobile communication terminal in the calling/called number specifying information from the acquisition request signal of routing information. Then, the mobile communication switching device specifying unit 230 acquires specification information that specifies the second mobile communication switching device 300 that controls the communication of the called-side mobile communication terminal 700 from the plurality of mobile communication switching devices, with reference to the location registration information stored in the storage unit 210 which is the location registration information of the called-side mobile communication terminal 700 specified by the called number. The mobile communication switching device specifying unit 230 outputs the specification information to the issuance request signal transmitting unit 240 and the acquisition response signal transmitting unit 260.

The issuance request signal transmitting unit 240 transmits the issuance request signal of the routing number to the second mobile communication switching device 300. When receiving the acquisition request signal of the routing information from the acquisition request signal receiving unit 220, the issuance request signal transmitting unit 240 extracts the calling/called number specifying information and the call information from the acquisition request signal of the routing information. Then, the issuance request signal transmitting unit 240 generates an issuance request signal of the routing number, which includes the calling/called number specifying information or call information. The issuance request signal transmitting unit 240 transmits the issuance request signal including the calling/called number specifying information and the call information to the second mobile communication switching device 300 specified by the specification information from the mobile communication switching device specifying unit 230 (S003 of FIG. 1).

The issuance response signal receiving unit 250 receives the issuance response signal of the routing number from the second mobile communication switching device 300, after the routing number is acquired. The issuance response signal receiving unit 250 receives the issuance response signal of the routing number from the second mobile communication switching device 300. The issuance response signal includes the routing number and the calling/called number specifying information. Then, the issuance response signal receiving unit 250 outputs the issuance response signal of the routing number to the acquisition response signal transmitting unit 260.

The acquisition response signal transmitting unit 260 transmits the acquisition response signal of the routing information to the first mobile communication switching device 100 after the routing number is acquired. When receiving the issuance response signal including the routing number and the calling/called number specifying information from the issuance response signal receiving unit 250, and the specification information from the mobile communication switching device specifying unit 230, the acquisition response signal transmitting unit 260 generates an acquisition response signal of the routing information, which includes the calling/called number specifying information. Then, the acquisition response signal transmitting unit 260 transmits the acquisition response signal of the routing information to the first mobile communication switching device 100 (S007 of FIG. 2).

(Configuration of Second Mobile Communication Switching Device 300)

The mobile communication switching device 300 will be described. FIG. 3 shows a hardware configuration diagram of the second mobile communication switching device 300. As shown FIG. 3, the second mobile communication switching device is physically constructed as a general computer system including, among others, a CPU 31, a main storage device such as a ROM 32 and a RAM 33, a communication module 34 such as a network card, which transmits and receives data between the first mobile communication switching device 100, the subscriber information management device 200, the radio access network 400, the E-UTRAN 500 and the mobile communication terminal 700, and an auxiliary storage device 35 such as a hard disk. Each function of the second mobile communication switching device 300, which is described later, is realized in a manner that the hardware such as the CPU 31, the ROM 32 and the RAM 33 is caused to read predetermined computer software and thereby the communication module 34 operates under the control of the CPU 31 while data is read from and written to the main storage devices 32, 33 or the auxiliary storage device 35.

Figure 6:
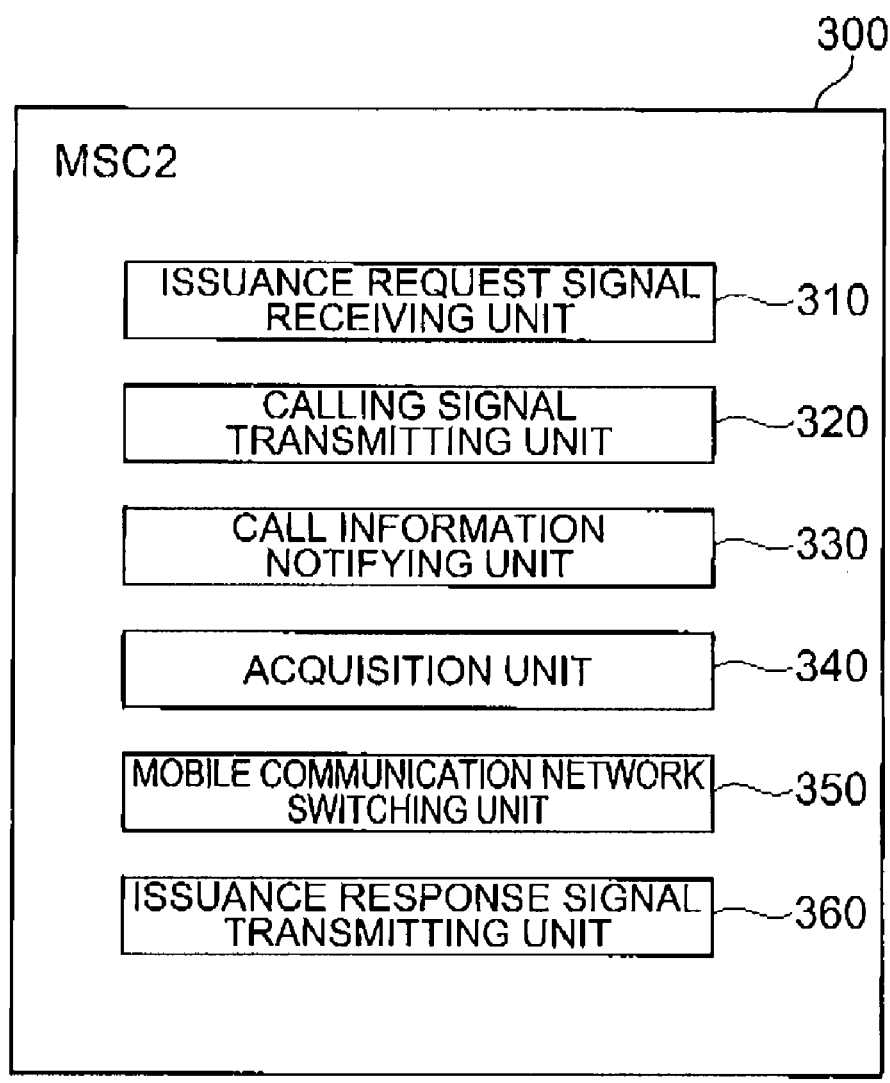
FIG. 6 is a schematic configuration diagram illustrating the second mobile communication switching device.

FIG. 6 is a schematic configuration diagram illustrating the second mobile communication switching device 300. As shown in FIG. 6, the second mobile communication switching device 300 functionally includes an issuance request signal receiving unit (issuance request signal receiving means) 310, a calling signal transmitting unit (calling signal transmitting means) 320, a call information notifying unit (call information notifying means) 330, an acquisition unit (acquisition means) 340, a mobile communication network switching unit 350 and an issuance response signal transmitting unit (issuance response signal transmitting means) 360.

The issuance request signal receiving unit 310 receives an issuance request signal of a routing number from the subscriber information management device 200. The issuance request signal receiving unit 310 receives the issuance request signal of the routing number from the subscriber information management device 200. The issuance request signal includes the calling/called number specifying information or the call information. The issuance request signal receiving unit 310 outputs the issuance request signal of the routing number to the calling signal transmitting unit 320 and the call information notifying unit 330.

The calling signal transmitting unit 320 transmits the calling signal to the called-side mobile communication terminal 700. When receiving the issuance request signal of the routing number from the issuance request signal receiving unit 310, the calling signal transmitting unit 320 generates a calling signal for performing the issuance of the routing number in response to the issuance request signal of the routing number. In addition, the calling signal transmitting unit 320 extracts a called number that specifies the called-side mobile communication terminal 700 in calling/called number specifying information from the input issuance request signal of the routing number. Then, the calling signal transmitting unit 320 transmits the generated calling signal to the mobile communication terminal 700 specified by the extracted called number via the E-UTRAN 500 (S004 of FIG. 1). The transmission of the calling signal, which is performed before a line is set, is referred to as pre-paging.

The call information notifying unit 330 transmits call contents related to the calling-side mobile communication terminal 600 to the called-side mobile communication terminal 700 in synchronization with the transmission of the calling signal. When receiving the issuance request signal of the routing number from the issuance request signal receiving unit 310, the call information notifying unit 330 extracts call information, which includes calling number information specifying the calling-side mobile communication terminal 600 and call type information representing a type of call from the calling-side mobile communication terminal 600, from the issuance request signal of the routing number, and generates a call information signal including the call information. The call information notifying unit 330 transmits the call information signal including the call information in synchronization with the transmission of the calling signal (S005 of FIG. 1). In addition, in this embodiment, the calling signal and call information signal are separately transmitted. However, the call information may be set to the calling signal, and thereby the calling signal including the call information may be transmitted to the called-side mobile communication terminal 700.

The acquisition unit 340 acquires the routing number. When receiving a switching indication signal, which switches the resident mobile communication network from the E-UTRAN 500 to the radio access network 400, as the response signal, from the called-side mobile communication terminal 700, in response to the calling signal transmitted from the calling signal transmitting unit 320, the acquisition unit 340 allocates a routing number, which corresponds to one channel among communication channels in the second mobile communication switching device 300, for communication of the called-side mobile communication terminal 700, thereby acquiring the routing number. The acquisition unit 340 outputs the acquired routing number to the issuance response signal transmitting unit 360. In addition, when the acquisition unit 340 receives a non-switching indication signal that indicates a non-switching from the called-side mobile communication terminal 700, the acquisition of the routing number is not performed.

The mobile communication network switching unit 350 switches a mobile communication network in which the called-side mobile communication terminal 700 is resident. When receiving a switching indication signal, which corresponds to call contents transmitted from the call information notifying unit 330, from the called-side mobile communication terminal 700, the mobile communication network switching unit 350 performs a process of switching the mobile communication network in which the called-side mobile communication terminal 700 is resident, for example, from the E-UTRAN 500 to the radio access network 400. In addition, when the mobile communication network switching unit 350 receives a non-switching indication signal that indicates a non-switching from the called-side mobile communication terminal 700, the switching of the mobile communication network is not performed. So-called CS fallback is performed by the mobile communication network switching unit 350.

The issuance response signal transmitting unit 360 transmits an issuance response signal including the routing number to the subscriber information management device 200. To the issuance response signal transmitting unit 360, a routing number allocated for the called-side mobile communication terminal 700 is input from the acquisition unit 340, and calling/called number specifying information including a called number specifying the called-side mobile communication terminal 700 that is an object of the issuance request is input from the issuance request signal receiving unit 310. Then, the issuance response signal transmitting unit 360 generates an issuance response signal of the routing number, which includes the calling/called number specifying information. The issuance response signal transmitting unit 360 transmits the issuance response signal of the routing number to the subscriber information management device 200 (S006 of FIG. 2). As described above, a line between the calling-side mobile communication terminal 600 and the called-side mobile communication terminal 700 is set based on the routing number, and thereby a call is established.

(Operation of Communication Control System 1)

Figure 7:
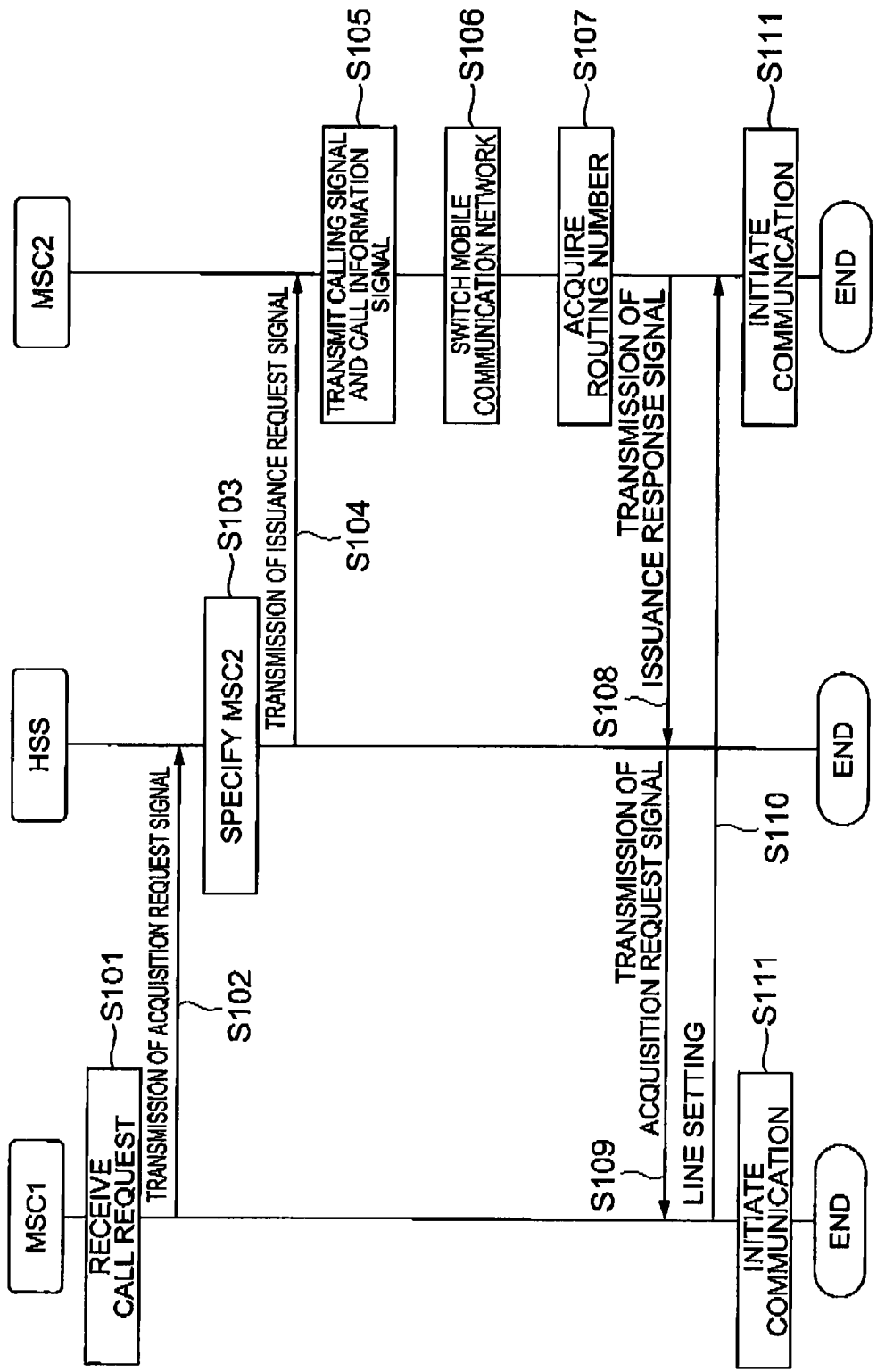
FIG. 7 is a sequence diagram illustrating an operation of the communication control system.

Subsequently, an operation (communication control method) performed by the communication control system 1 will be described with reference to FIG. 7. FIG. 7 is a sequence diagram illustrating an operation of the communication control system 1.

First, in the first mobile communication switching device 100, the call request signal receiving unit 110 receives a call request signal from the calling-side mobile communication terminal 600 via the radio access network 400 (call request signal receiving step, S101). The call request signal includes calling/called number specifying information specifying a calling number of the calling-side mobile communication terminal 600 and a called number of the called-side mobile communication terminal 700, and call information including calling number information specifying the calling-side mobile communication terminal 600 and call type information representing a type of call from the calling-side mobile communication terminal 600.

Subsequently, in the first mobile communication switching device 100, the acquisition request signal transmitting unit 120 generates an acquisition request signal of routing information in response to the call request signal and transmits the acquisition request signal to the subscriber information management device 200 (acquisition request signal transmitting step, S102). The acquisition request signal includes the calling/called number specifying information and the call information extracted from the call request signal.

Subsequently, in the subscriber information management device 200, the acquisition request signal receiving unit 220 receives the acquisition request signal (acquisition request signal receiving step), and the mobile communication switching device specifying unit 230 specifies the second mobile communication switching device 300 that controls the communication of the called-side mobile communication terminal 700 with reference to a location registration information of the called-side mobile communication terminal 700 (mobile communication switching device specifying step, S103).

In addition, in the subscriber information management device 200, the issuance request signal transmitting unit 240 generates an issuance request signal of the routing number allocated to the called-side mobile communication terminal 700 and transmits the issuance request signal to the second mobile communication switching device 300 specified in step S103 (issuance request signal transmitting step, S104). The issuance request signal includes the called/calling number specifying information and call information.

Subsequently, in the second mobile communication switching device 300, the issuance request signal receiving unit 310 receives the issuance request signal (issuance request signal receiving step), and the calling signal transmitting unit 320 generates a calling signal based on the issuance request signal and transmits the calling signal to the called-side mobile communication terminal 700 (calling signal transmitting step, S105). In addition, in the second mobile communication switching device 300, the call information notifying unit 330 extracts call information, which includes calling number information specifying the calling-side mobile communication terminal 600 and call type information representing a type of a call from the calling-side mobile communication terminal 600, from the issuance request signal, and generates a call information signal including the call information. Then, the call information notifying unit 330 transmits the call information signal to the called-side mobile communication terminal 700 in synchronization with the transmission of the calling signal via the E-UTRAN 500 (call information notifying step, S105).

In the called-side mobile communication terminal 700, the received call information signal may be displayed on a display unit and thereby the call contents are confirmed by a user. As a result of the confirmation, when complying with a call signal from the calling signal transmitting unit 320, according to a user's operation, a switching indication signal, which indicates the switching of the resident mobile communication network from the E-UTRAN 500 to the radio access network 400, is transmitted to the second mobile communication switching device 300 as a response signal. When the second mobile communication switching device 300 receives the switching indication signal, in the second mobile communication switching device 300, at first, the mobile communication network switching unit 350 switches the mobile communication network in which the called-side mobile communication terminal 700 is resident, from the E-UTRAN 500 to the radio access network 400 (S106). That is, a CS fallback is performed. In addition, the called-side mobile communication terminal 700 can select the non-switching of the resident mobile communication network without complying with the calling signal, depending on the displayed call contents. In this case, the non-switching indication signal is transmitted to the second mobile communication switching center 300. In this case, in the called-side mobile communication terminal 700, a state where it connects to the E-UTRAN 500 is maintained, for example, a data communication by the called-side mobile communication terminal 700 is continued.

Subsequently, in the second mobile communication switching device 300, when the switching indication signal is received as a response signal corresponding to the calling signal, the acquisition unit 340 acquires a routing number for the called-side mobile communication terminal 700 (acquisition step S107). Then, in the second mobile communication switching device 300, the issuance response signal transmitting unit 360 generates an issuance response signal of the routing number and transmits it to the subscriber information management device 200 (S108).

Subsequently, in the subscriber information management device 200, the issuance response signal receiving unit 250 receives the issuance response signal of the routing number, and the acquisition response signal transmitting unit 260 generates routing information including the routing number acquired in step S107 and specification information specifying the second mobile communication switching device 300, which is obtained in step S103. Then, the acquisition response signal transmitting unit 260 transmits the acquisition response signal of the routing information to the first mobile communication switching device 100 (S109). In addition, the calling/called number specifying information is also included in the acquisition response signal.

Subsequently, in the first mobile communication switching device 100, the acquisition response signal receiving unit 130 receives the acquisition response signal of the routing information, and extracts the routing number, the specification information and the calling/called number specifying information from the acquisition response signal. Then, the line setting unit 140 performs a line setting with respect to the routing number in the second mobile communication switching device 300 specified by the specification information, in which the mobile communication terminal 600 specified by the calling number specifying information of the calling/called number specifying information is a calling side (S110). Therefore, the calling-side mobile communication terminal 600 connects to the called-side mobile communication terminal 700 and thereby the voice call is established between the mobile communication terminals (S111).

According to this embodiment, in the routing information acquisition step before setting a line, the first mobile communication switching device 100 generates the acquisition request signal including the call information and transmits it to the subscriber information management device 200. Subsequently, the subscriber information management device 200 that received the acquisition request signal including the call information generates the issuance request signal that specifies the called-side second mobile communication switching device 300 and includes the call information, and transmits the issuance request signal to the specified second mobile communication switching device 300. Then, when the second mobile communication switching device 300 that received the issuance request signal including the call information transmits the calling signal to the called-side mobile communication terminal 700, the call information is transmitted to the mobile communication terminal 700. As described above, when the second mobile communication switching device 300 transmits the calling signal, that is, when the pre-paging is performed, it is transmitted together with the call contents of the calling-side mobile communication terminal 600, such that it is possible to inform a user of the called-side mobile communication terminal 700, that is, a called party of the call contents at an early stage. In addition, since the call contents are able to be notified before a determination of a process such as switching the mobile communication network, in the called-side mobile communication terminal 700, the called party can select the switching of the mobile network based on the information. For example, in a case where a call is made when downloading software using a high-speed data transmission, according to the present embodiment, it is possible for the called party to decide to call back after the downloading, depending on the calling party included in the call contents and to select the non-switching of the mobile network, thereby increasing the convenience of the mobile communication terminal user.

Hereinbefore, the invention is described in detail based on the embodiment thereof, but the invention is not limited to the embodiment described above. For example, in this embodiment, the second mobile communication switching device 300 transmits the call information, which includes both of the calling number information specifying the calling-side mobile communication terminal 600 and the call type information representing the type of the call from the calling-side mobile communication terminal 600, to the called-side mobile communication terminal 700. However, at least one of the calling number information and the call type information may be transmitted as the call information. That is, the call information may be at least one of the calling number information and the call type information. In addition, in a case where the call information includes only the calling number information, the calling number of the calling-side mobile communication terminal 600 in the calling/called number specifying information may be used as the call information. In addition, in the above-described embodiment, the called-side mobile communication terminal 700 is resident in the E-UTRAN 500 at first, and the mobile communication network is switched at the time of acquiring the routing number. However, the called-side mobile communication terminal 700 may be resident, from the beginning, in the mobile access network 400 in which the calling-side mobile communication terminal 600 is resident and the mobile communication network may not be switched at the time of acquiring the routing number.

The invention claimed is:

1. A communication control system comprising: a first mobile communication switching device that controls the communication of a calling-side mobile communication terminal; a second mobile communication switching device that controls the communication of a called-side mobile communication terminal; and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set, wherein the first mobile communication switching device includes, call request signal receiving means that receives, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal, and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device, wherein the subscriber information management device includes, acquisition request signal receiving means that receives the acquisition request signal of the routing information from the first mobile communication switching device, mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information, and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means, and wherein the second mobile communication switching device includes, issuance request signal receiving means that receives the issuance request signal of the routing number from the subscriber information management device, calling signal transmitting means that transmits the calling signal to the called-side mobile communication terminal based on the issuance request signal of the routing number received by the issuance request signal receiving means, call information notifying means that extracts the call information from the issuance request signal of the routing number received by the issuance request signal receiving means, and transmits the call information to the called-side mobile communication terminal when the calling signal transmitting means transmits the calling signal, and acquisition means that receives a response signal transmitted from the called-side mobile communication terminal in response to the transmission of the calling signal from the calling signal transmitting means and acquires the routing number.

2. The communication control system according to claim 1, further comprising:

mobile communication network switching means that receives a switching indication signal from the called-side mobile communication terminal, which indicates the switching from a mobile communication network in which the called-side mobile communication terminal is resident to another mobile communication network in which the calling-side mobile communication terminal is resident, in response to the transmission of the call information to the called-side mobile communication terminal by the call information notifying means, and switches the mobile communication network to cause the called-side mobile communication terminal to be resident in another mobile communication network in which the calling-side mobile communication terminal is resident.

3. A first mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the first mobile communication switching device comprising:

call request signal receiving means that receives, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal, and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device.

4. A subscriber information management device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the subscriber information management device comprising:

acquisition request signal receiving means that receives, from the first mobile communication switching device, the acquisition request signal of the routing information, which includes calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal;

mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information; and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means.

5. A second mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the second mobile communication switching device comprising:

issuance request signal receiving means that receives, from the subscriber information management device, the issuance request signal of the routing number which includes calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal;

calling signal transmitting means that transmits the calling signal to the called-side mobile communication terminal based on the issuance request signal of the routing number received by the issuance request signal receiving means;

call information notifying means that extracts the call information from the issuance request signal of the routing number received by the issuance request signal receiving means, and transmits the call information to the called-side mobile communication terminal when the calling signal transmitting means transmits the calling signal; and acquisition means that receives a response signal transmitted from the called-side mobile communication terminal in response to the transmission of the calling signal from the calling signal transmitting means and acquires the routing number.

6. A communication control system comprising: a first mobile communication switching device that controls the communication of a calling-side mobile communication terminal; a second mobile communication switching device that controls the communication of a called-side mobile communication terminal; and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set, wherein the first mobile communication switching device includes, call request signal receiving means that receives, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal, and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device, wherein the subscriber information management device includes, acquisition request signal receiving means that receives the acquisition request signal of the routing information from the first mobile communication switching device, mobile communication switching device specifying means that extracts the calling/called number specifying information from the acquisition request signal of the routing information received by the acquisition request signal receiving means, and specifies the second mobile communication switching device controlling the communication of the called-side mobile communication terminal with reference to the location registration information of the called-side mobile communication terminal specified by the calling/called number specifying information, and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means, and wherein the second mobile communication switching device includes, issuance request signal receiving means that receives the issuance request signal of the routing number from the subscriber information management device, calling signal transmitting means that transmits the calling signal to the called-side mobile communication terminal based on the issuance request signal of the routing number received by the issuance request signal receiving means, call information notifying means that extracts the call information from the issuance request signal of the routing number received by the issuance request signal receiving means, and transmits the call information to the called-side mobile communication terminal when the calling signal transmitting means transmits the calling signal, and acquisition means that receives a response signal transmitted from the called-side mobile communication terminal in response to the transmission of the calling signal from the calling signal transmitting means and acquires the routing number.

7. The communication control system according to claim 6, further comprising:

mobile communication network switching means that receives a switching indication signal from the called-side mobile communication terminal, which indicates the switching from a mobile communication network in which the called-side mobile communication terminal is resident to another mobile communication network in which the calling-side mobile communication terminal is resident, in response to the transmission of the call information to the called-side mobile communication terminal by the call information notifying means, and switches the mobile communication network to cause the called-side mobile communication terminal to be resident in another mobile communication network in which the calling-side mobile communication terminal is resident.

8. A first mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the first mobile communication switching device comprising:

call request signal receiving means that receives, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal; and acquisition request signal transmitting means that extracts the calling/called number specifying information and the call information from the call request signal received by the call request signal receiving means, generates an acquisition request signal of routing information, which includes the calling/called number specifying information and the call information, and transmits the acquisition request signal of the routing information to the subscriber information management device.

9. A subscriber information management device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the subscriber information management device comprising:

acquisition request signal receiving means that receives, from the first mobile communication switching device, the acquisition request signal of the routing information, which includes calling/called number specifying information that specifies a calling number of the calling-side mobile communication terminal and a called number of the called-side mobile communication terminal, and call information that is calling number information specifying the calling-side mobile communication terminal;

mobile communication switching device specifying means that extracts the calling/called number specifying information from the acquisition request signal of the routing information received by the acquisition request signal receiving means, and specifies the second mobile communication switching device controlling the communication of the called-side mobile communication terminal, with reference to the location registration information of the called-side mobile communication terminal specified by the calling/called number specifying information; and issuance request signal transmitting means that extracts the calling/called number specifying information and the call information from the acquisition request signal of the routing information received by the acquisition request signal receiving means, generates an issuance request signal of a routing number, which includes the calling/called number specifying information and the call information, and transmits the issuance request signal of the routing number to the second mobile communication switching device specified by the mobile communication switching device specifying means.

10. A second mobile communication switching device used in a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, in which routing information is acquired and a calling signal is transmitted to the called-side mobile communication terminal before a communication line between the calling-side mobile communication terminal and the called-side mobile communication terminal is set, the second mobile communication switching device comprising:

issuance request signal receiving means that receives, from the subscriber information management device, the issuance request signal of the routing number which includes calling/called number specifying information that specifies a calling number of the calling-side mobile communication terminal and a called number of the called-side mobile communication terminal, and call information that is calling number information specifying the calling-side mobile communication terminal;

calling signal transmitting means that transmits the calling signal to the called-side mobile communication terminal based on the issuance request signal of the routing number received by the issuance request signal receiving means;

call information notifying means that extracts the call information from the issuance request signal of the routing number received by the issuance request signal receiving means, and transmits the call information to the called-side mobile communication terminal when the calling signal transmitting means transmits the calling signal; and acquisition means that receives a response signal transmitted from the called-side mobile communication terminal in response to the transmission of the calling signal from the calling signal transmitting means and acquires the routing number.

11. A communication control method of a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set, the method comprising:

a call request signal receiving step of causing the first mobile communication switching device to receive, from the calling-side mobile communication terminal, a call request signal including calling/called number specifying information that specifies a calling number of the calling-side mobile communication terminal and a called number of the called-side mobile communication terminal, and call information that includes at least one of calling number information specifying the calling-side mobile communication terminal and call type information representing a type of a call from the calling-side mobile communication terminal, and an acquisition request signal transmitting step of causing the first mobile communication switching device to extract the calling/called number specifying information and the call information from the call request signal received in the call request signal receiving step, generate an acquisition request signal of routing information, which includes the calling/called number specifying information and the call information, and transmit the acquisition request signal of the routing information to the subscriber information management device;

an acquisition request signal receiving step of causing the subscriber information management device to receive the acquisition request signal of the routing information from the first mobile communication switching device;

a mobile communication switching device specifying step of causing the subscriber information management device to extract the calling/called number specifying information from the acquisition request signal of the routing information received in the acquisition request signal receiving step, and specify the second mobile communication switching device controlling the communication of the called-side mobile communication terminal with reference to the location registration information of the called-side mobile communication terminal specified by the calling/called number specifying information;

an issuance request signal transmitting step of causing the subscriber information management device to extract the calling/called number specifying information and the call information from the acquisition request signal of the routing information received in the acquisition request signal receiving step, generate an issuance request signal of a routing number, which includes the calling/called number specifying information and the call information, and transmit the issuance request signal of the routing number to the second mobile communication switching device specified in the mobile communication switching device specifying step;

an issuance request signal receiving step of causing the second mobile communication switching device to receive the issuance request signal of the routing number from the subscriber information management device;

a calling signal transmitting step of causing the second mobile communication switching device to transmit the calling signal to the called-side mobile communication terminal based on the issuance request signal of the routing number received in the issuance request signal receiving step;

a call information notifying step of causing the second mobile communication switching device to extract the call information from the issuance request signal of the routing number received in the issuance request signal receiving step, and transmit the call information to the called-side mobile communication terminal when the calling signal is transmitted in the calling signal transmitting step; and an acquisition step of causing the second mobile communication switching device to receive a response signal transmitted from the called-side mobile communication terminal in response to the transmission of the calling signal in the calling signal transmitting step and acquire the routing number.

12. A communication control method of a communication control system including a first mobile communication switching device that controls the communication of a calling-side mobile communication terminal, a second mobile communication switching device that controls the communication of a called-side mobile communication terminal and a subscriber information management device that manages location registration information of both the mobile communication terminals, wherein routing information is acquired and a calling signal is transmitted to the called-side mobile communication terminal before a communication line between the calling-side mobile communication terminal and the called-side mobile communication terminal is set, the method comprising:

a call request signal receiving step of causing the first mobile communication switching device to receive, from the calling-side mobile communication terminal, a call request signal including calling/called number specifying information that specifies a calling number of the calling-side mobile communication terminal and a called number of the called-side mobile communication terminal, and call information that is calling number information specifying the calling-side mobile communication terminal, and an acquisition request signal transmitting step of causing the first mobile communication switching device to extract the calling/called number specifying information and the call information from the call request signal received in the call request signal receiving step, generate an acquisition request signal of routing information, which includes the calling/called number specifying information and the call information and transmit the acquisition request signal of the routing information to the subscriber information management device;

an acquisition request signal receiving step of causing the subscriber information management device to receive the acquisition request signal of the routing information from the first mobile communication switching device;

a mobile communication switching device specifying step of causing the subscriber information management device to extract the calling/called number specifying information from the acquisition request signal of the routing information received in the acquisition request signal receiving step, and specify the second mobile communication switching device controlling the communication of the called-side mobile communication terminal with reference to the location registration information of the called-side mobile communication terminal specified by the calling/called number specifying information;

an issuance request signal transmitting step of causing the subscriber information management device to extract the calling/called number specifying information and the call information from the acquisition request signal of the routing information received in the acquisition request signal receiving step, generate an issuance request signal of a routing number, which includes the calling/called number specifying information and the call information, and transmit the issuance request signal of the routing number to the second mobile communication switching device specified in the mobile communication switching device specifying step;

an issuance request signal receiving step of causing the second mobile communication switching device to receive the issuance request signal of the routing number from the subscriber information management device;

a calling signal transmitting step of causing the second mobile communication switching device to transmit the calling signal to the called-side mobile communication terminal based on the issuance request signal of the routing number received in the issuance request signal receiving step;

a call information notifying step of causing the second mobile communication switching device to extract the call information from the issuance request signal of the routing number received in the issuance request signal receiving step, and transmit the call information to the called-side mobile communication terminal when the calling signal is transmitted in the calling signal transmitting step; and an acquisition step of causing the second mobile communication switching device to receive a response signal transmitted from the called-side mobile communication terminal in response to the transmission of the calling signal in the calling signal transmitting step and acquire the routing number.

* * * * *